(12) United States Patent
Makofka

(10) Patent No.: US 11,936,950 B2
(45) Date of Patent: Mar. 19, 2024

(54) METHODS AND SYSTEMS FOR CONTENT DELIVERY

(71) Applicant: COMCAST CABLE COMMUNICATIONS, LLC, Philadelphia, PA (US)

(72) Inventor: Douglas Makofka, Jim Thorpe, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 173 days.

(21) Appl. No.: 16/700,644

(22) Filed: Dec. 2, 2019

(65) Prior Publication Data

US 2021/0168443 A1   Jun. 3, 2021

(51) Int. Cl.
- *H04N 21/442* (2011.01)
- *H04N 21/2183* (2011.01)
- *H04N 21/231* (2011.01)
- *H04N 21/647* (2011.01)

(52) U.S. Cl.
CPC ..... *H04N 21/4424* (2013.01); *H04N 21/2183* (2013.01); *H04N 21/23103* (2013.01); *H04N 21/64723* (2013.01)

(58) Field of Classification Search
CPC ........... H04N 21/4424; H04N 21/2183; H04N 21/23103; H04N 21/64723; H04N 21/44008; H04N 21/437; H04N 21/442; H04N 21/83
USPC ....................................................... 709/229
See application file for complete search history.

(56) References Cited

U.S. PATENT DOCUMENTS

| | | | |
|---|---|---|---|
| 8,972,537 B2* | 3/2015 | Bastian | H04L 45/306 709/240 |
| 10,547,703 B2* | 1/2020 | Flack | H04L 67/568 |
| 10,743,036 B1* | 8/2020 | Farris | H04N 21/2353 |
| 10,764,391 B2* | 9/2020 | Choi | H04L 67/2885 |
| 10,880,407 B2* | 12/2020 | Reynolds | H04L 69/14 |
| 2013/0013789 A1* | 1/2013 | Sivasubramanian | H04L 67/1097 709/226 |
| 2016/0261414 A1* | 9/2016 | Lee | H04L 9/3271 |
| 2020/0019975 A1* | 1/2020 | Lavigne | G06Q 30/0282 |
| 2020/0296451 A1* | 9/2020 | Hassler | H04N 21/2402 |
| 2022/0391887 A1* | 12/2022 | Jakobsson | H04L 9/3239 |
| 2023/0032830 A1* | 2/2023 | Hoffert | H04N 21/4384 |
| 2023/0128125 A1* | 4/2023 | Johns | H04L 67/10 709/219 |
| 2023/0300216 A1* | 9/2023 | Power | H04L 67/5681 709/213 |

* cited by examiner

*Primary Examiner* — Tauqir Hussain
(74) *Attorney, Agent, or Firm* — Ballard Spahr LLP

(57) ABSTRACT

Methods and systems for content delivery are described. A content delivery network may include a request server that receives a request for content from a client device. The request server may send the request to each caching device among a plurality of caching devices. Each caching device may receive the service query and assess its current health based on one or more parameters. Each caching device may wait for a duration of time before responding to the request based on the determined current health. The caching device that is first to respond to the request may be the caching device that has the most available resources to provide the requested content to the client device.

20 Claims, 7 Drawing Sheets

METHODS AND SYSTEMS FOR CONTENT DELIVERY

BACKGROUND

A content distribution network ("CDN") may store content items, such as shows or programs that were previously broadcast or recently broadcast, in caching devices to allow client devices to consume the content items at a later time on-demand or in real-time. A CDN typically includes several caching devices that may provide requested content to a client device. Determining which caching device is to provide the requested content may be based on each caching device's current health (e.g., load, available resources, etc.). Existing solutions to track the health of caching devices require a server to periodically request that each caching device provide a report of its current health. The reports are then stored at the third party entity and used to determine which caching device is to provide requested content to the client device. These existing solutions are inefficient and introduce unnecessary complexity into the CDN. These and other considerations are addressed by the present description.

SUMMARY

It is to be understood that both the following general description and the following detailed description are exemplary and explanatory only and are not restrictive. Methods and systems for content delivery are described herein. A content delivery network ("CDN") may include a cluster of caching devices that provide requested content to a client device. The CDN may also include a request server that receives the request for the content from the client device and sends the request to each caching device in the cluster.

Each caching device in the cluster may receive the request. Each caching device in the cluster may assess its current health based on one or more parameters, such as computational load, number of requests received, etc. Each caching device may wait for a duration of time before responding to the request. The duration of time may be different for each caching device based on its respective level of health. The caching device that has the most available resources (e.g., highest level of health) may delay its response to the request the least amount of time, and it may therefore be the first caching device to respond to the request. Each of the caching devices that may determine whether it has received an indication from any other caching device in the cluster indicating the other caching device has responded to the request. The caching device that has the most available resources may determine it has not received an indication from any other caching device in the cluster indicating the other caching device has responded to the request. The caching device that has the most available resources may indicate to the request server and/or each remaining caching device in the cluster that it will respond to the client device. The caching device that has the most available resources may directly respond to the request and send the content to the client device. As another example, the caching device that has the most available resources may send an inquiry to the request server to determine whether any other caching device in the cluster has responded to the request. The request server may indicate to the caching device that has the most available resources that no other caching device has responded. The caching device that has the most available resources may indicate to the request server and/or each remaining caching device in the cluster that it will respond to the client device.

In some instances, there may be two caching devices that respond to the request server at, or substantially near, a same time (e.g., within a threshold amount of time). The request server may determine which among the two caching devices is to provide the requested content based on one or more network parameters. The request server may instruct a first caching device among the two caching devices to respond to the request for the content based on the first caching device and/or connections with the first caching device satisfying the one or more network parameters.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the methods and systems described herein.

DETAILED DESCRIPTION

Figure 1:
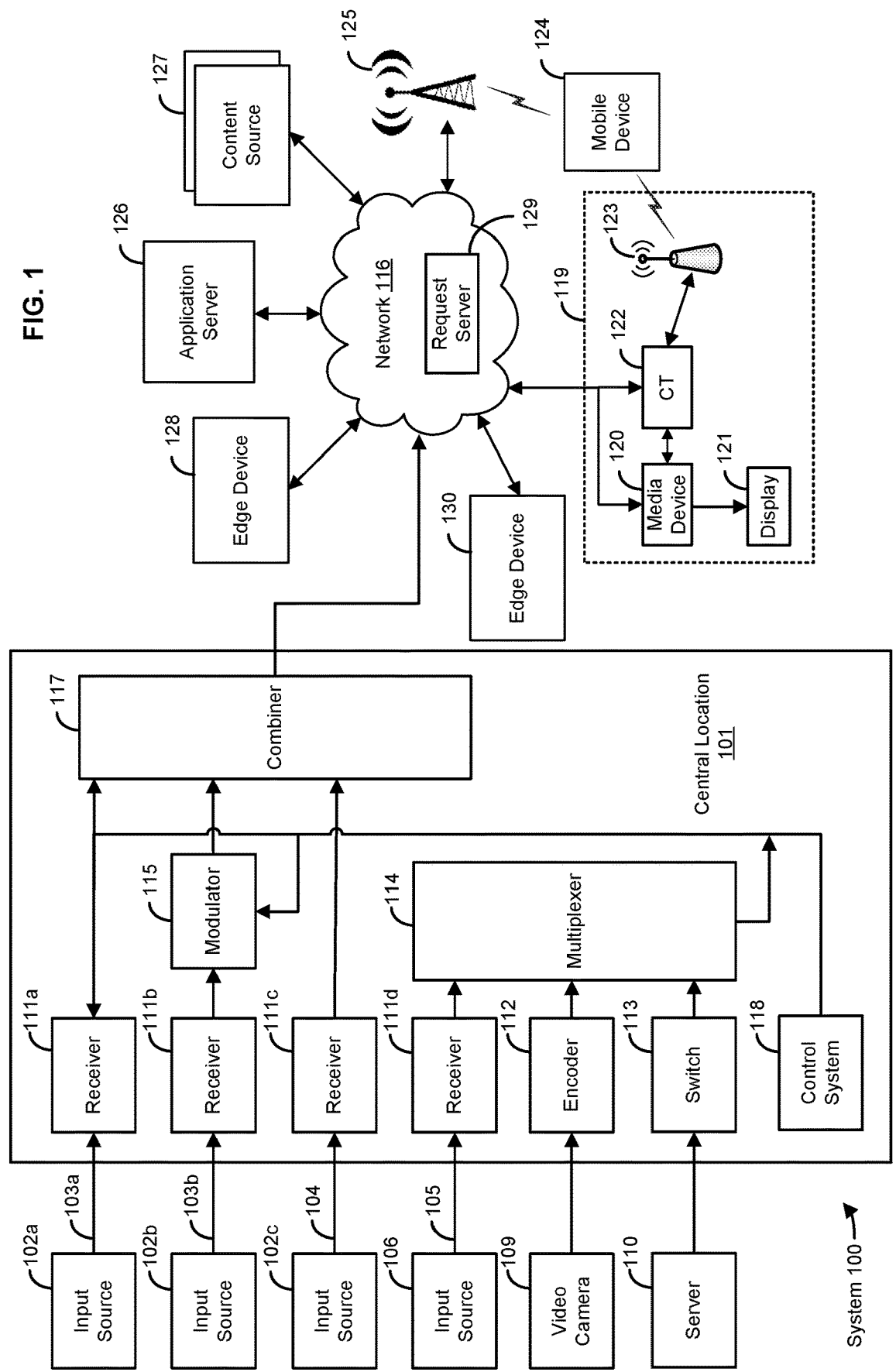
FIG. 1 shows an example content delivery system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, 8k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0,1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "sending" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

Described herein are methods and systems for content delivery. A content delivery network ("CDN") may include a cluster of caching devices (e.g., at least two caching devices) that provide requested content to a client device. The CDN may also include a request server, such as a Domain Name Server, that receives the request for the content from the client device and sends the request to each caching device in the cluster. Each caching device may receive the request. Each caching device in the cluster may assess its current health based on one or more parameters.

For example, the one or more parameters may include a number of requests received; a processor utilization; a thread count; a memory utilization; a network utilization; a service availability (e.g., response time, success rate, etc.); whether the caching device currently has the requested content stored in memory; a combination thereof, and/or the like. The determined current health may represent a current load on the caching device. For example, the current health may represent a current load on the caching device during a recent time interval (e.g., the prior minute, five minutes, fifteen minutes, or another time interval). The determined current health may represent an anticipated future load on a caching device. For example, the caching device may be configured to predict a value of the determined current health over a future time interval (e.g., the next minute, five minutes, fifteen minutes, or another time interval) based on a number of outstanding requests for content, etc.

Each caching device may wait for a duration of time before responding to the request. The duration of time (e.g., a response delay) for a caching device may be based on the determined current health of the caching device. The duration of time may be different for each caching device based on its respective current health. The duration of time may also be based on back-off algorithms. For example, to prevent two equally capable (e.g., equally healthy) caching devices from responding at the same time, the duration of time may include an additional amount of time (e.g., microseconds) based on a back-off algorithm. The back-off algorithm may use an identifier related to the request and/or related to each individual caching device as a coefficient to determine the additional amount of time (e.g., the additional amount of time would not be the same for any two caching devices). The caching device that has the most available resources (hereinafter, the "most available caching device") may delay its response to the request the least amount of time and may therefore be the first caching device to respond to the request. The most available caching device may determine whether it has received an indication from any other caching device in the cluster indicating the other caching device has responded to the request. The most available caching device may determine it has not received an indication from any other caching device in the cluster indicating the other caching device has responded to the request. The most available caching device may indicate to the request server and/or each remaining caching device in the cluster that it will respond to the client device. The most available caching device may directly respond to the request and send the content to the client device. As another example, the most available caching device may send an inquiry to the request server to determine whether any other caching device in the cluster has responded to the request. The request server may indicate to the most available caching device that no other caching device has responded. The most available caching device may indicate to the request server and/or each remaining caching device in the cluster that it will respond to the client device. The most available caching device may respond to the request and send the content to the client device. In some instances, the most available caching device may not notify each other caching device in the cluster when it responds to the request (e.g., the caching devices may not be in communication with each other). The request server may receive at least one additional inquiry from at least one other caching device after the request server received the inquiry from the most available caching device. The request server may be configured to discard the at least one additional inquiry.

In other instances, two caching devices may respond to the request at, or substantially near, a same time (e.g., within a threshold amount of time). The request server may determine that a collision has occurred based on receiving the two responses at, or substantially near, the same time. To prevent the client device from receiving the content from more than one caching device, the request server may determine which among the two caching devices that responded at, or substantially near, the same time is to provide the requested content. The request server may make this determination based on one or more network parameters. For example, a network parameter may indicate that a nearest caching device with respect to the client device is to provide the requested content in such a scenario. As another example, a network parameter may indicate a caching device having a lowest amount of network latency with respect to the client device is to provide the requested content. As a further example, a network parameter may indicate that a best bitrate that is available to select from among the two caching devices is to be provided to the client device. Other network parameters may be used as well. The request server may determine which among the two caching devices is to provide the requested content based on the one or more network parameters. The request server may instruct a first caching device among the two caching devices to respond to the request for the content based on the first caching device satisfying the one or more network parameters.

FIG. 1 shows a system 100 for content delivery. Those skilled in the art will appreciate that digital equipment and/or analog equipment may be employed. One skilled in the art will appreciate that provided herein is a functional description and that the respective functions may be performed by software, hardware, or a combination of software and hardware. The system 100 may have a central location 101 (e.g., a headend), which may receive content (e.g., data, input programming, and the like) from multiple sources. The central location 101 may combine the content from the various sources and may distribute the content to user (e.g., subscriber) locations (e.g., a user location 119) via a network 116 (e.g., content distribution and/or access system).

The central location 101 may receive content from a variety of sources 102a, 102b, and 102c. The content may be sent from any of the sources 102a, 102b, or 102c to the central location 101 via a variety of transmission paths, including wireless paths (e.g., satellite paths 103a, 103b) and terrestrial paths 104. The central location 101 may also receive content from input 106, such as a direct feed source, via a direct line 105 (e.g., one or more communication links and/or one or more communication paths). Other input sources may be capture devices such as a video camera 109 or a server 110. The content sent by the content sources may comprise a single content item, a portion of a content item (e.g., content fragment), a content stream, a multiplex that includes several content items, and/or the like. The content item may be an advertisement.

The central location 101 may have one or a plurality of receivers 111a, 111b, 111c, 111d that are associated with one or more corresponding input sources. The central location 101 may include one or more encoders 112, switches 113, multiplexers, and/or the like. An encoder 112 may compress, encrypt, transform, and/or otherwise encode content. The encoder 112 may encode content based on one or more compression standards, such as MPEG. The encoder may receive content from a video camera 109 and/or other source and apply one or more encoding algorithms to the received content. A switch 113 may provide access to a server 110, which may be a Pay-Per-View server, a data server, an internet router, a network system, a phone system, and the like. Some signals may require additional processing, such as signal multiplexing, prior to being modulated. Such multiplexing may be performed by a multiplexer 114.

The central location 101 may include one or more modulators 115 for interfacing with a network 116. A modulator may receive content from a receiver 111, encoder 112, multiplexer 114, and/or the like. A modulator 115 may convert the received content into a modulated output signal suitable for transmission over the network 116. A modulator 115 may map portions of the content to data bits expressed as signals (e.g., sinusoidal signals) at corresponding sub carrier frequencies of a data symbol. The output signals from the modulator 115 may be combined (e.g., packaged), using equipment such as a combiner 117 (e.g., a packaging device), for input into the network 116.

The network 116, and the system 100 generally, may be a content distribution network, a content access network, and/or the like. The network 116 may be configured to send content from a variety of sources using a variety of network paths, protocols, devices, and/or the like. The network 116 may be managed (e.g., deployed, serviced) by a content provider, a service provider, and/or the like. The network 116 may have a plurality of communication links connecting a plurality of devices.

A control system 118 may permit a system operator to control and monitor the functions and performance of system 100. The control system 118 may interface, monitor, and/or control a variety of functions, including, but not limited to, the channel lineup for a television system, billing for each user, conditional access for content distributed to users, and the like. The control system 118 may provide input to the modulators 115 for setting operating parameters, such as system specific MPEG table packet organization or conditional access information. The control system 118 may be located at the central location 101 or at a remote location.

The network 116 may distribute signals from the central location 101 to user locations, such as a user location 119. The network 116 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

A multitude of users may be connected to the network 116. At the user location 119, a media device 120 may demodulate and/or decode, if needed, the signals for display on a display device 121, such as on a television set (TV) or a computer monitor. The media device 120 may be a demodulator, decoder, frequency tuner, and/or the like. The media device 120 may be directly connected to the network 116 (e.g., for communications via in-band and/or out-of-band signals of a content delivery network) and/or connected to the network 116 via a communication terminal 122 ("CT") (e.g., for communications via a packet switched network). The media device 120 may be a set-top box, a digital streaming device, a gaming device, a media storage device, a digital recording device, a computing device, a mobile computing device (e.g., a laptop, a smartphone, a tablet, etc.), a combination thereof, and/or the like. The media device 120 may implement one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or a satellite dish.

The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), and/or the like. The communication terminal 122 may be configured for communication with the network 116 via a variety of protocols, such as internet protocol, transmission control protocol, file transfer protocol, session initiation protocol, voice over internet protocol, and/or the like. The communication terminal 122, for a cable network, may be configured to provide network access via a variety of communication protocols and standards, such as Data Over Cable Service Interface Specification (DOCSIS).

A first access point 123 (e.g., a wireless access point) may be located at the user location 119. The first access point 123 may be configured to provide one or more wireless networks in at least a portion of the user location 119. The first access point 123 may be configured to provide access to the network 116 to devices configured with a compatible wireless radio, such as a mobile device 124, the media device 120, the display device 121, or other computing devices (e.g., laptops, sensor devices, security devices). The first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

The user location 119 may not necessarily be fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). The mobile device 124 may communicate with a second access point 125. The second access point 125 may be a cell tower, a wireless hotspot, another mobile device, and/or other remote access point. The second access point 125 may be within range of the user location 119 or remote from the user location 119. The second access point 125 may be located along a travel route, within a business or residence, or other useful locations (e.g., travel stop, city center, park, etc.).

The system 100 may have an application server 126. The application server 126 may provide services related to applications. The application server 126 may have an application store. The application store may be configured to allow users to purchase, download, install, upgrade, and/or otherwise manage applications. The application server 126 may be configured to allow users to download applications to a device, such as the mobile device 124, communications terminal 122, the media device 120, the display device 121, and/or the like. The application server 126 may run one or more application services to send data, handle requests, and/or otherwise facilitate operation of applications for the user.

The system 100 may have one or more content sources 127. The content source 127 may be configured to send content (e.g., video, audio, games, applications, data) to the user. The content source 127 may be configured to send streaming media, such as on-demand content (e.g., video on-demand), content recordings, and/or the like. The content source 127 may be managed by third party content providers, service providers, online content providers, over-the-top content providers, and/or the like. The content may be provided via a subscription, by individual item purchase or rental, and/or the like. The content source 127 may be configured to send the content via a packet switched network path, such as via an internet protocol (IP) based connection. The content may be accessed by users via applications, such as mobile applications, television applications, set-top box applications, gaming device applications, and/or the like. An application may be a custom application (e.g., by content provider, for a specific device), a general content browser (e.g., web browser), an electronic program guide, and/or the like.

The network 116 may have a request server 129. The request server 129 may be any device, module, and/or the like communicatively coupled to the network 116. The request server 129 may be a router, a switch, a splitter, a packager, a gateway, an encoder, a storage device, a multiplexer, a network access location (e.g., tap), physical link, and/or the like. The request server 129 may receive requests for content from one or more of the media device 120, the mobile device 124, and/or any other client device of the system 100 (e.g., collectively, a "requesting device"). The request server 129 may direct the requesting device to an edge device 128 for receiving the requested content. The edge device 128 may be configured to send the requested content to the requesting device. The edge device 128 may be one of a plurality of edge devices distributed across the network 116. The edge device 128 may be located in a region proximate to the user location 119. The request for content from the requesting device may be directed to the edge device 128 by the request server 129 (e.g., due to the location of the edge device and/or network conditions). The edge device 128 may be configured to receive packaged content (e.g., from the central location 101 and/or any of the sources 102*a*, 102*b*, or 102*c*) for delivery to the requesting device, convert content for delivery to the requesting device (e.g., in a specific format requested by a user device), send the requesting device a manifest file (e.g., or other index file describing portions of the content), send streaming content (e.g., unicast, multicast), provide a file transfer, and/or the like. The edge device 128 may cache or otherwise store content (e.g., frequently requested content) to enable faster delivery of content to requesting devices.

The edge device 128 may receive a request for content from the requesting device (e.g., based on the requesting device being instructed to do so by the request server 129). The edge device 128 may establish a communication link with the requesting device. The edge device 128 may determine whether the edge device 128 has access to the requested content. The edge device 128 may determine whether the edge device 128 has access to the requested content after receiving the request for content from the requesting device. The edge device 128 may determine whether a cache associated with the edge device 128 has the requested content (e.g., a mid-tier cache, such as the central location 101). If the edge device 128 does not have access to the requested content, the edge device 128 may request the requested content from the central location 101, a second edge device 128 (not shown) and/or the content source 127.

The system 100 may have a second edge device 130. Each of the edge devices 128, 130 may receive the request for content from the request server 129. Each of the edge devices 128, 130 may receive the request. Each caching device in the cluster may assess its current health based on one or more parameters. For example, the one or more parameters may include a number of requests received; a processor utilization; a thread count; a memory utilization; a network utilization; a service availability (e.g., response time, success rate, etc.); whether the edge device 128 and/or 130 currently has the requested content stored in memory; a combination thereof, and/or the like. The determined current health may represent a current load on the edge device 128 and/or 130. For example, the current health may represent a current load on the edge device 128 and/or 130 during a recent time interval (e.g., the prior minute, five minutes, fifteen minutes, or another time interval). The determined current health may represent an anticipated future load on the edge device 128 and/or 130. For example, the edge devices 128, 130 may be configured to predict a value of the determined current health over a future time interval (e.g., the next minute, five minutes, fifteen minutes, or another time interval) based on a number of outstanding requests for content, etc.

Each of the edge devices 128, 130 may wait for a duration of time before responding to the request. The duration of time (e.g., a response delay) for the edge device 128 and/or 130 may be based on the determined current health. The duration of time may be different for each of the edge devices 128, 130 based on its respective current health. The duration of time may also be based on back-off algorithms known in the art. The edge device 128 may have the most available resources and delay its response to the request a lesser amount of time as compared to the edge device 130. The edge device 128 may therefore be the first caching device to respond to the request. The edge device 128 may determine whether it has received an indication from any other caching device, such as the edge device 130 or any other caching device of the system 100, indicating the other caching device has responded to the request. The edge device 130 may determine it has not received an indication from any other caching device indicating the other caching device has responded to the request. The edge device 128 may directly respond to the request and send the content to the requesting device. As another example, the edge device 128 may send an inquiry to the request server 129 to determine whether any other caching device in the system 100 has responded to the request. The request server 129 may indicate to the edge device 128 that no other caching device has responded. The edge device 128 may indicate to the request server 129 and/or each remaining caching device in the system 100 (e.g., the edge device 130) that the edge device 128 will respond to the requesting device. The edge device 128 may respond to the request and send the content to the requesting device. In some instances, the edge device 128 may not notify each other caching device in the system 100 (e.g., the edge device 130) when it responds to the request (e.g., the edge devices 128, 130 may not be in communication with each other).

The edge device 128 and/or 130 may establish a communication link with the central location 101, a different caching device and/or the content source 127 to receive the requested content. The edge device 128 and/or 130 may track the content received from the central location 101, a different caching device and/or the content source 127. The control system 118 may determine that the central location 101 does not have access to the requested content. The control system 118 may establish a communication link with input source 102*a* (e.g., based on the request for the content). The input source 102*a* may send a redirect message to the control system 118 indicating that the requested content is available from an input source, such as, for example, input source 102*b*. The central location may receive the requested content from input source 102*b* and provide the requested content to the edge device 128 and/or 130 for delivery to the requesting device.

Figure 2:
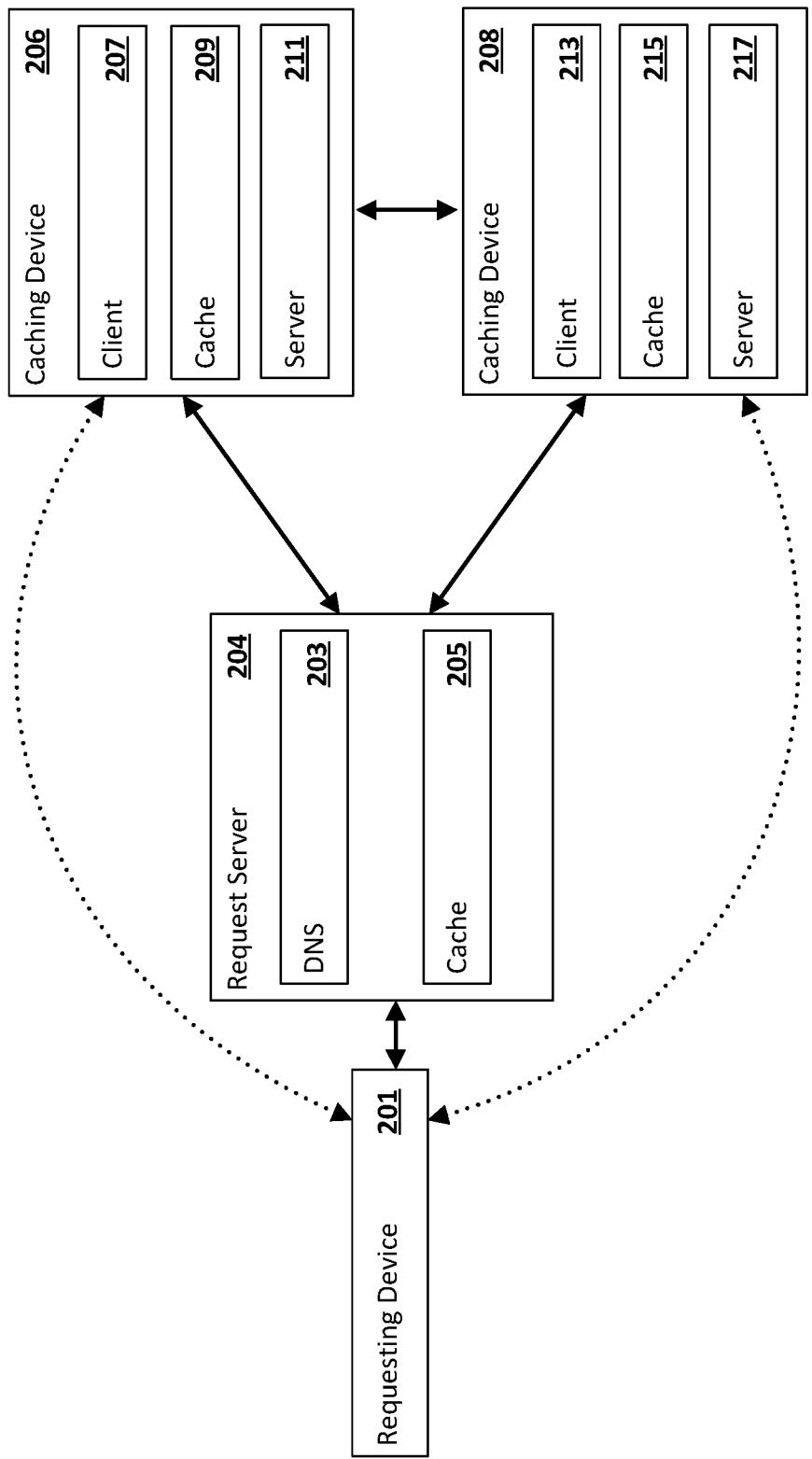
FIG. 2 shows an example content delivery system.

FIG. 2 shows a system 200 for content delivery. The system 200 may have a requesting device 201. The requesting device 201 may be any one of the media device 120, the mobile device 124, and/or any other client device of the system 100. The system 200 may have a request server 204, such as the request server 129 of the system 100. The system 200 may have a caching device 206 and a caching device 208. Each of the caching device 206 and the caching device 208 may be any cache device of the system 100, such as the edge device 128 or the central location 101.

The request server 204 may have a Domain Name Server ("DNS") module 203 and a cache 205. The DNS module 203 may receive a request for content from the requesting device 201 in the form of a Uniform Resource Locator ("URL"). The request server 204 may use the DNS module 203 to resolve the request for the content. For example, the DNS module 203 may resolve the request for the content by providing the request (e.g., the URL) to the caching device 206 and/or the caching device 208. The request server 204 may store the request for the content in the cache 205. The request server 204 may also store responses to service queries received from one or both of the caching device 206 or the caching device 208 in the cache 205.

The caching device 206 may have a client module 207, a cache 209, and a server module 211. The caching device 206 may receive content and store the received content in the cache 209. The server module 211 may communicate with another device. The server module 211 may communicate with a packaging device (not shown), the request server 204, and/or the caching device 208. The caching device 206 may receive content from the packaging device. The caching device 206 may also send requested content to the caching device 208 and/or the requesting device 201.

The client module 207 may communicate with another device. The client module 207 may communicate with a packaging device (not shown). As an example, the client module 207 may establish a communication link with the packaging device in order to receive content. The client module 207 may request content that is not in the cache 209. The caching device 206 may receive a request for content (e.g., from the requesting device 201), and may determine that the cache 209 does not have the requested content. Thus, the client module 207 may establish a communication link with the packaging device to request the missing content. The client module 207 may also receive the missing content via other caching methods and processes known in the art. Once the caching device 206 receives the missing content, the client module 207 may send the content to the requesting device 201.

The server module 211 may be configured to communicate with another device. The server module 211 may communicate with the caching device 208, the request server 204, and/or the requesting device 201. The server module 211 may be configured to handle communications for the caching device 206. Specifically, the server module 211 may open and/or create a communication link to communicate with the caching device 208, the request server 204, and/or the requesting device 201. The server module 211 may send content to the requesting device 201 via the opened/created communication link. After the communication link is established, the server module 211 may send a plurality of content fragments to the requesting device 201.

The caching device 208 may have a client module 213, a cache 215, and a server module 217. The caching device 208 may receive content and store the received content in the cache 215. The server module 217 may communicate with another device. The server module 217 may communicate with a packaging device (not shown), the request server 204, and/or the caching device 206. The caching device 208 may receive content from the packaging device. The caching device 208 may also send requested content to the caching device 206 and/or the requesting device 201.

The client module 213 may communicate with another device. The client module 213 may communicate with a packaging device (not shown). As an example, the client module 213 may establish a communication link with the packaging device in order to receive content. The client module 213 may request content that is not in the cache 215. The caching device 208 may receive a request for content (e.g., from the requesting device 201), and may determine that the cache 215 does not have the requested content. Thus, the client module 213 may establish a communication link with the packaging device to request the missing content. The client module 213 may also receive the missing content via other caching methods and processes known in the art. Once the caching device 208 receives the missing content, the client module 213 may send the content to the requesting device 201.

The server module 217 may be configured to communicate with another device. The server module 217 may communicate with the caching device 206, the request server 204, and/or the requesting device 201. The server module 217 may be configured to handle communications for the caching device 208. Specifically, the server module 217 may open and/or create a communication link to communicate with the caching device 206, the request server 204, and/or the requesting device 201. The server module 217 may send content to the requesting device 201 via the opened/created communication link. After the communication link is established, the server module 217 may send a plurality of content fragments to the requesting device 201.

The request server 204 may receive a request for content from the requesting device 201 and send the request to the caching device 206 and/or the caching device 208 as a service query message. The service query may include the request for the content (e.g., identify the requested content by a URL). As indicated by the dashed lines in FIG. 2, either the caching device 206 or the caching device 208 may respond directly to the requesting device 201 by sending the requested content. The first among the caching device 206 and the caching device 208 to respond to the request may be the caching device that has the most available resources (e.g., the most "healthy").

Each of the caching device 206 and the caching device 208 may receive the service query. Each of the caching device 206 and the caching device 208 may assess its current health based on one or more parameters. For example, the one or more parameters may include a number of requests received; a processor utilization; a thread count; a memory utilization; a network utilization; a service availability (e.g., response time, success rate, or the like); a combination thereof, and/or the like. The determined current health may represent a current load on the caching device. For example, the current health may represent a current load on a caching device during a recent time interval (e.g., the prior minute, five minutes, fifteen minutes, or another time interval). The determined current health may represent an anticipated future load on the caching device. For example, the caching device may be configured to predict a value of the determined current health over a future time interval (e.g., the next minute, five minutes, fifteen minutes, or another time interval) based on a number of outstanding requests for content, etc.

Each of the caching device 206 and the caching device 208 may wait for a duration of time before responding to the request. The duration of time (e.g., a response delay) for each of the caching device 206 and the caching device 208 may be based on the determined current health of each of the caching device 206 and the caching device 208. The duration of time may be different for the caching device 206 as compared to the caching device 208 based on its respective current health. The duration of time may be function of the respective current health, a defined constant, and/or an amount of time that is randomly determined by the caching device. For example, the respective current health for the caching device 206 may be a level of processor utilization by for the caching device 206 in terms of a percentage (e.g., 42%). The defined constant may be a quantity of seconds, microseconds, a portion thereof, and/or the like (e.g., 1 second) that is assigned to the caching device 206 by a control device and/or by the caching device 206 itself. The amount of time that is randomly determined by the caching device 206 may be a quantity of seconds, microseconds, a portion thereof, and/or the like (e.g., 0.05 seconds). The duration of time for the caching device 206 may be determined as the respective current health for the caching device 206 times the defined constant (e.g., 42%×1) plus the amount of time that is randomly determined by the caching device 206 (e.g., (42%×1)+0.05)=0.47 seconds). While this example describes the respective current health for the caching device 206 to be a level of processor utilization by for the caching device 206, is to be understood that other parameters can be used instead of, or in addition to, a level of processor utilization (e.g., one or more parameters described herein).

The duration of time may also be based on back-off algorithms known in the art. For example, to prevent both of the caching devices 206 and 208 from responding at the same time, the duration of time may include an additional amount of time (e.g., a number of microseconds) based on a back-off algorithm. The back-off algorithm may use an identifier related to the request and/or related to the caching device 206 and/or the caching device 208 as a coefficient to determine the additional amount of time (e.g., the additional amount of time would not be the same for both of the caching devices 206 and 208).

For ease of explanation, the following example describes the caching device 206 as being the caching device that has the most available resources. It is to be understood, however, that the caching device 208 may be the caching device that has the most available resources. As the caching device 206 has the most available resources, it may delay its response to the request the least amount of time as compared to the caching device 208. The caching device 206 may therefore be the first caching device to respond to the request. The caching device 206 may determine whether it has received an indication from any other caching device (e.g., caching device 208) indicating the other caching device has responded to the request. As another example, the caching device 206 may send an inquiry to the request server 204 to determine whether the caching device 208 has responded to the request. The request server 204 may indicate to the caching device 206 that no other caching device has responded. The caching device 206 may indicate to the request server 204 and/or to the caching device 208 that it will respond to the request and provide the content to the client device 201. The caching device 206 may respond to the request and send the content to the client device 201. In some instances, the caching device 206 may not notify the caching device 208 when it responds to the request (e.g., the caching device 206 may not be in communication with the caching device 208). The request server 204 may receive an additional inquiry from the caching device 208 after the request server 204 received the inquiry from the caching device 206. The request server 204 may be configured to discard the additional inquiry.

In some instances, both the caching device 206 and the caching device 208 may send an inquiry to the request server 204 (e.g., thereby indicating both are able to respond to the request) at, or substantially near, a same time (e.g., within a threshold amount of time). The request server 204 may determine that a collision has occurred based on receiving the two responses at, or substantially near, the same time. To prevent the requesting device 201 from receiving the content from both the caching device 206 and the caching device 208, the request server 204 may determine which among the caching device 206 or the caching device 208 is to provide the requested content. The request server 204 may make this determination based on one or more network parameters. For example, a network parameter may indicate that a nearest caching device with respect to the requesting device 201 is to provide the requested content. As another example, a network parameter may indicate a caching device having a lowest amount of network latency with respect to the requesting device 201 is to provide the requested content. As a further example, a network parameter may indicate that a best bitrate that is available to select from among the two caching devices is to be provided to the requesting device 201. Other network parameters may be used as well. The request server 204 may determine which among the caching devices 206 and 208 is to provide the requested content based on the one or more network parameters. The request server 204 may instruct a first caching device among the two caching devices to respond to the request based on the first caching device satisfying the one or more network parameters.

While FIG. 2 is described with only one requesting device 201, one request server 204, and two caching devices 206,208 for ease of explanation, a person skilled in the art would appreciate there could be a plurality of each of the devices. Also, while a single communication link is shown between each of the requesting device 201, the request server 204, and the two caching devices 206,208 for ease of explanation, a person skilled in the art would appreciate there may be multiple communication links between the devices, such as a communication link for a manifest, another communication link for video content, a third communication link for audio content, and so forth. Further, while the DNS module 203 is shown as being a part of the request server 204, for ease of explanation, it is to be understood that the DNS module 203 may reside within (e.g., be a part of) a separate entity/device (not shown).

Figure 3:
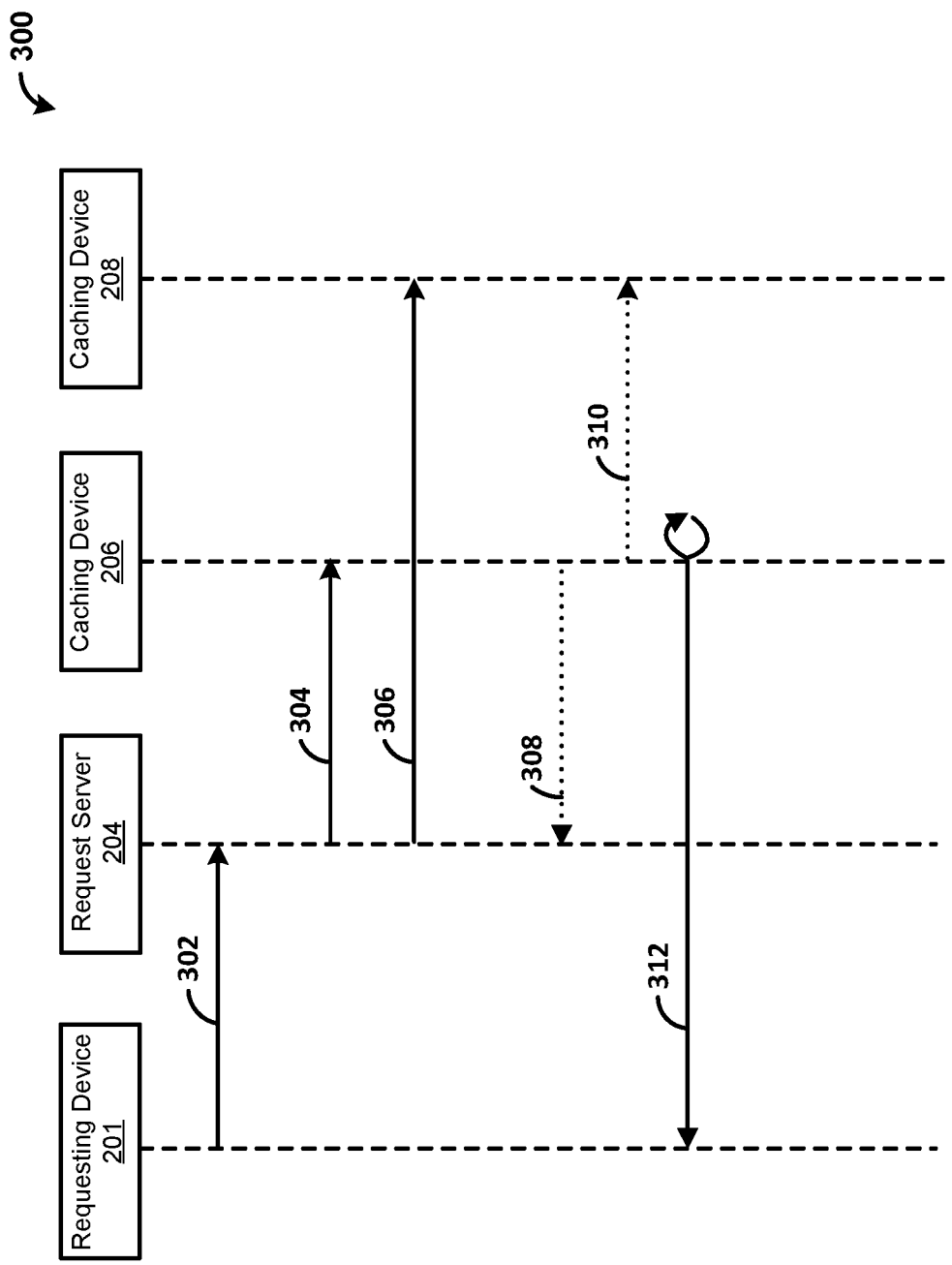
FIG. 3 shows an example communications flow for a content delivery system.

FIG. 3 shows an example communications flow 300 for content delivery. The communications flow 300 may be implemented by the devices shown in FIG. 2. At 302, the request server 204 may receive a request for content from the requesting device 201. At 304 and 306, which may occur at substantially a same time, the request server 204 may send a service query to each of the caching device 206 and the caching device 208. The service query may include the request for the content (e.g., identify the requested content).

Each of the caching device 206 and the caching device 208 may receive the service query. Each of the caching device 206 and the caching device 208 may assess its current health based on the one or more parameters. Each of the caching device 206 and the caching device 208 may wait for a duration of time before responding to the request. The duration of time (e.g., a response delay) for the caching device 206 may be based on its determined current health as described herein. The duration of time for the caching device 206 may be a function of the caching device's 206 current health, a defined constant, and/or an amount of time that is randomly determined by the caching device 206, as described herein. The duration of time for the caching device 206 may also include an additional amount of time based on one or more back-off algorithms known in the art. The duration of time (e.g., a response delay) for the caching device 208 may be based on its determined current health as described herein. The duration of time for the caching device 208 may be a function of the caching device's 208 current health, a defined constant, and/or an amount of time that is randomly determined by the caching device 208, as described herein. The duration of time for the caching device 208 may also include an additional amount of time based on one or more back-off algorithms known in the art.

The caching device 206 may determine (e.g., after the duration of time elapses) whether it has received an indication from the caching device 208 indicating the caching device 208 has responded to the request. For example, the caching device 206 may determine after the duration of time elapses that it has not received an indication from the caching device 208 indicating the caching device 208 has responded to the request, and the caching device 206 may proceed directly to 312 and send the requested content to the requesting device 201 (e.g., at a time following the performance of 304 and/or 306 plus the duration of time). Thus, the caching device 206 may have the most available resources, since it responded to the service query first. Optionally, at 308, which may occur prior in time (if performed) to step 312, the caching device 206 may send a service query response to the request server 204. At 310, which may occur at substantially a same time as 308 (if performed), the caching device 206 may notify the caching device 208 that it is will provide the requested content to the requesting device 201. At 312, the caching device 206 may send the requested content to the requesting device 201.

Figure 4:
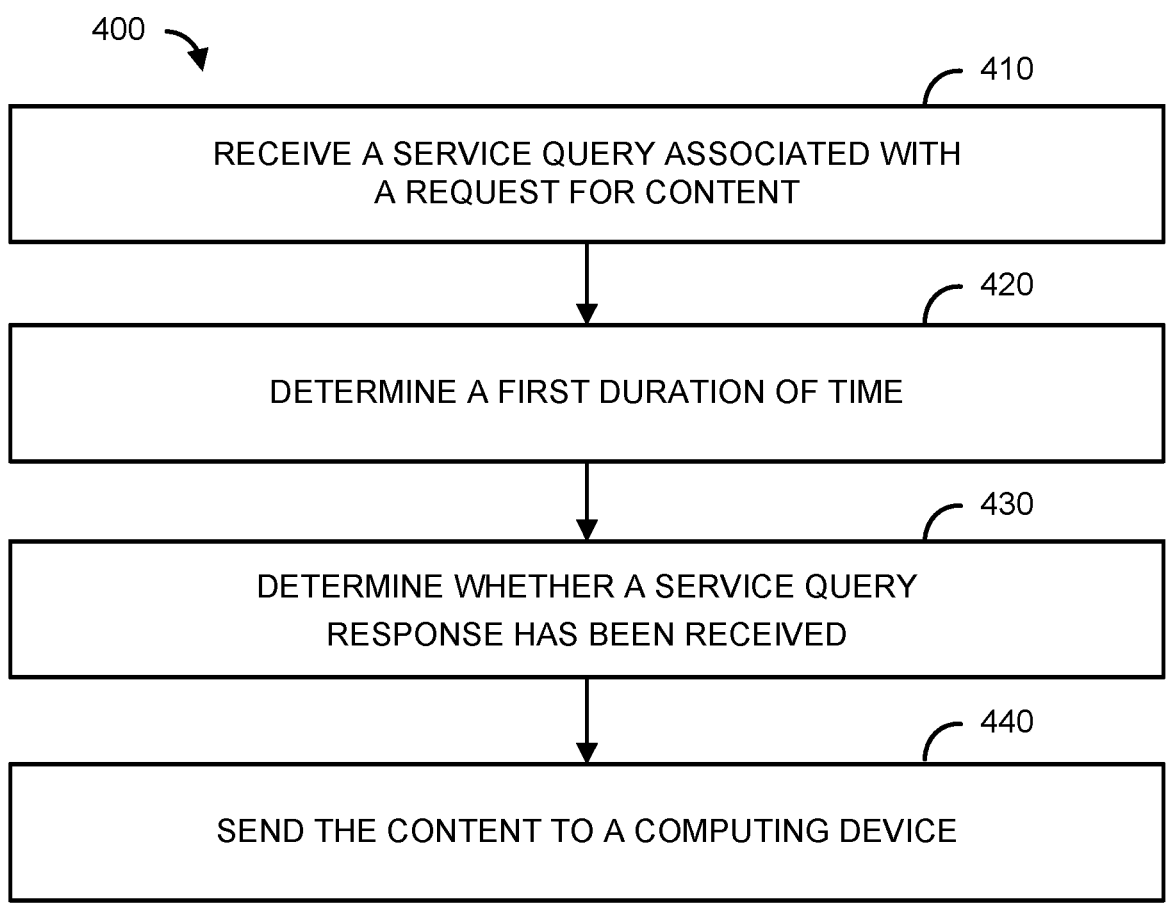
FIG. 4 shows a flowchart of an example method for content delivery.

FIG. 4 is a flowchart of a method 400 for content delivery in accordance with the present description. Th method 400 may be implemented using the system 100 of FIG. 1 and/or the system 200 of FIG. 2. For example, the method 400 may be performed by a first caching device, such as the edge cache 128 or 130, the caching device 206 or 208, etc. At step 410, the first caching device may receive a service query associated with a request for content from a first computing device. For example, the first computing device (e.g., the request server 204) may receive a request for content from a requesting device (e.g., the requesting device 201) and send the request to the first caching device as a service query. The service query may include the request for the content (e.g., identify the requested content by a URL). The first caching device may be one of a plurality of caching devices in communication with the first computing device. The first computing device may send the service query to each of the plurality of caching devices. A caching device among the plurality of caching devices that has the most available resources to provide the requested content (e.g., to a requesting device) may respond to the service query first. The request for content may have been received by the first computing device from a second computing device.

At step 420, the first caching device may determine a first duration of time (e.g., a response delay). The first duration of time may be based on the service query and one or more parameters. For example, a service parameter may include a determination by the first caching device that the requested content is not resident in memory of the first caching device and an estimated time required to request and receive the content from a content source. As another example, a service parameter may include a computational load of the first caching device, a number of requests for content received by the first caching device within a threshold amount of time, and/or a network load of the first caching device. As a further example, a service parameter may include a fail over status of the first caching device. When the first caching device is operating in place of a failed over other caching device, the first caching device may be close to, or beyond, its intended operating capacity. The first caching device may use the one or more parameters to determine its current health, as described herein. The first duration of time for the first caching device may be based on the determined current health and/or a function of the determined current health, a defined constant, and/or an amount of time that is randomly determined by the first caching device, as described herein. The first duration of time may also include an additional amount of time based on one or more back-off algorithms known in the art.

At step 430, the first caching device may determine whether the service query has been fulfilled by another caching device. (e.g., completed by another caching device). For example, the first caching device may determine whether it has received a service query response from another caching device indicating the other caching device has sent the content to the second computing device. As another example, the first caching device may send an inquiry to the first computing device to determine whether another caching device has indicated to the first computing device that the other caching device has sent the content to the second computing device The first caching device may make this determination after the first duration of time elapses (e.g., the first caching device waits for the first duration of time prior to making the determination). At step 440, the first caching device may send the content to the second computing device. The second computing device may be a requesting device, such as the requesting device 201. The content may be sent to the second computing device in response to determining that the first caching device has not received a service query response from another caching device.

Method 400 may include additional steps and features. For example, the first caching device may receive the service query from at least one additional caching device, such as another caching device of the plurality of caching devices. The at least one additional caching device may have received the service query from the first caching device. The at least one additional caching device may determine a second duration of time based on the service query and the one or more parameters (e.g., parameters corresponding to the at least one additional caching device). The second duration of time may correspond to a response delay by the at least one additional caching device with respect to the service query.

The at least one additional caching device may receive the first service query response from the first caching device. The first service query response may be received by the at least one additional caching device may after the first duration of time elapses but prior to the second duration of time elapsing. The first service query response may cause the at least one additional caching device to refrain from sending a second service query response to the first computing device.

As another example, the first computing device may receive the first service query response from the first caching device at a first time, and a second service query response may be received by the first computing device may from the at least one additional caching device at a second time. The first time may occur prior to the second time. The first computing device determine a collision between the first service query and the second service query. Based on the collision and the first service query response, the first computing device may determine that the first caching device satisfies one or more network parameters. The first computing device may instruct the second computing device to send the request for content to the first caching device. For example, the first computing device may instruct the second computing device to send the request for content to the first caching device based on the first caching device satisfying the one or more network parameters. The one or more network parameters may include one or more of: a latency associated with a network connection between the second computing device and the first caching device, a latency associated with a network connection between the second computing device and the second caching device, a geographic distance between the second computing device and the first caching device, a geographic distance between the second computing device and the second caching device, a bitrate associated with the content, a combination thereof, and/or the like.

Figure 5:
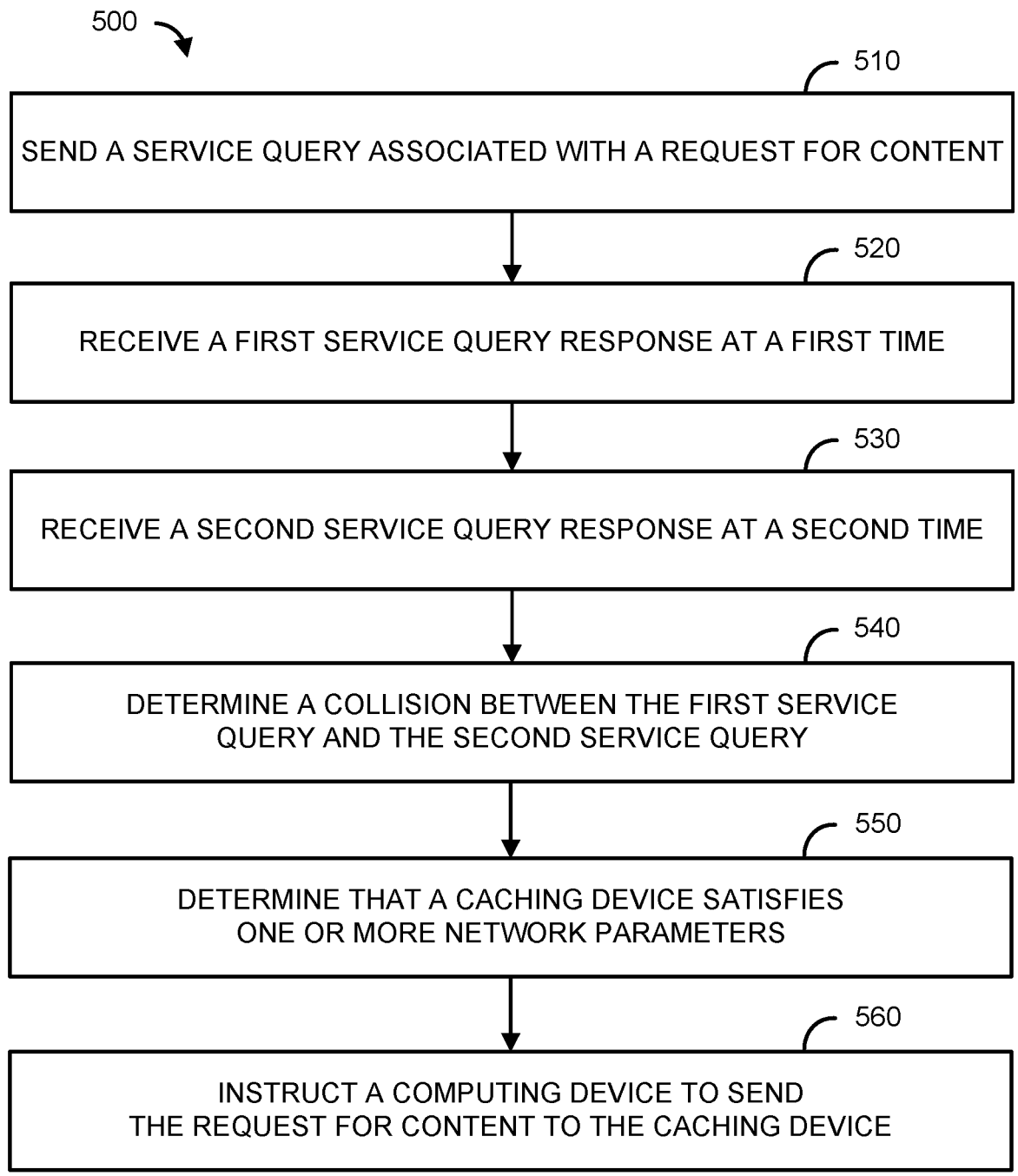
FIG. 5 shows a flowchart of an example method for content delivery.

FIG. 5 is a flowchart of a method 500 for content delivery in accordance with the present description. Th method 500 may be implemented using the system 100 of FIG. 1 and/or the system 200 of FIG. 2. For example, the method 500 may be performed by a first computing device, such as the request server 204. At step 510, the first computing device may send a service query associated with a request for content received from a second computing device. The first computing device may send the service query to a first caching device and a second caching device. For example, the first computing device may receive the request for content from the second computing device (e.g., the requesting device 201) and send the request to the first caching device and the second caching device as a service query. The service query may include the request for the content (e.g., identify the requested content by a URL). The first caching device and the second caching device may be part of a plurality of caching devices in communication with the first computing device, which may be a request server such as the request server 204. The first computing device may send the service query to each of the plurality of caching devices to ascertain which among the plurality of caching devices has sufficient resources to provide the requested content (e.g., to a requesting device).

At step 520, a first service query response may be received by the first computing device. For example, the first service query response may be received by the first computing device from the first caching device at a first time. At step 530, a second service query response may be received by the first computing device. For example, the second service query response may be received by the first computing device from the second caching device at a second time. The first time may occur prior to the second time. At step 540, the first computing device determine a collision between the first service query and the second service query. For example, the first computing device may determine the collision based on receiving the first service query and the second service query in response to the service query. The first computing device may take action to resolve the collision.

At step 550, based on the collision and the first service query response, the first computing device may determine that the first caching device satisfies one or more network parameters. The one or more network parameters may include one or more of: a latency associated with a network connection between the second computing device and the first caching device, a latency associated with a network connection between the second computing device and the second caching device, a geographic distance between the second computing device and the first caching device, a geographic distance between the second computing device and the second caching device, a bitrate associated with the content, a combination thereof, and/or the like. At step 560, the first computing device may instruct the second computing device to send the request for content to the first caching device. For example, the first computing device may instruct the second computing device to send the request for content to the first caching device based on the first caching device satisfying the one or more network parameters.

Method 500 may include additional steps and features. For example, the first caching device may determine a first response delay based on the service query and its current health, which may be determined based on one or more parameters. The first response delay may include a first duration of time. The one or more parameters may include a number of requests received; processor utilization; thread count; memory utilization; network utilization; service availability (e.g., response time, success rate, or the like); a combination thereof, and/or the like. The determined current health may represent a current load on a caching device. For example, the current health may represent a current load on a caching device during a recent time interval (e.g., the prior minute, five minutes, fifteen minutes, or another time interval). The determined current health may represent an anticipated future load on a caching device. For example, the first caching device may be configured to predict a value of the determined current health over a future time interval (e.g., the next minute, five minutes, fifteen minutes, or another time interval) based on a number of outstanding requests for content, etc. The first response delay may be based on the determined current health and/or a function of the determined current health, a defined constant, and/or an amount of time that is randomly determined by the first caching device, as described herein. The first response delay may also include an additional amount of time based on one or more back-off algorithms known in the art.

The second caching device may determine a second response delay based on the service query and its current health, which may be determined based on one or more parameters. The second response delay for the second caching device may be based on the determined current health and/or a function of the determined current health, a defined constant, and/or an amount of time that is randomly determined by the second caching device, as described herein. The second response delay may also include an additional amount of time based on one or more back-off algorithms known in the art. The second response delay may include a second duration of time that is substantially equal to the first duration of time (e.g., within a range of one or more seconds, milliseconds, microseconds, etc.). The first caching device may send the first service query response to the first computing device after the first duration of time elapses. The second caching device may send the second service query response to the first computing device after the second duration of time elapses. The first service query response may indicate the first caching device has sufficient resources to provide the content to the second computing device. The second service query response may indicate the second caching device has sufficient resources to provide the content to the second computing device.

Figure 6:
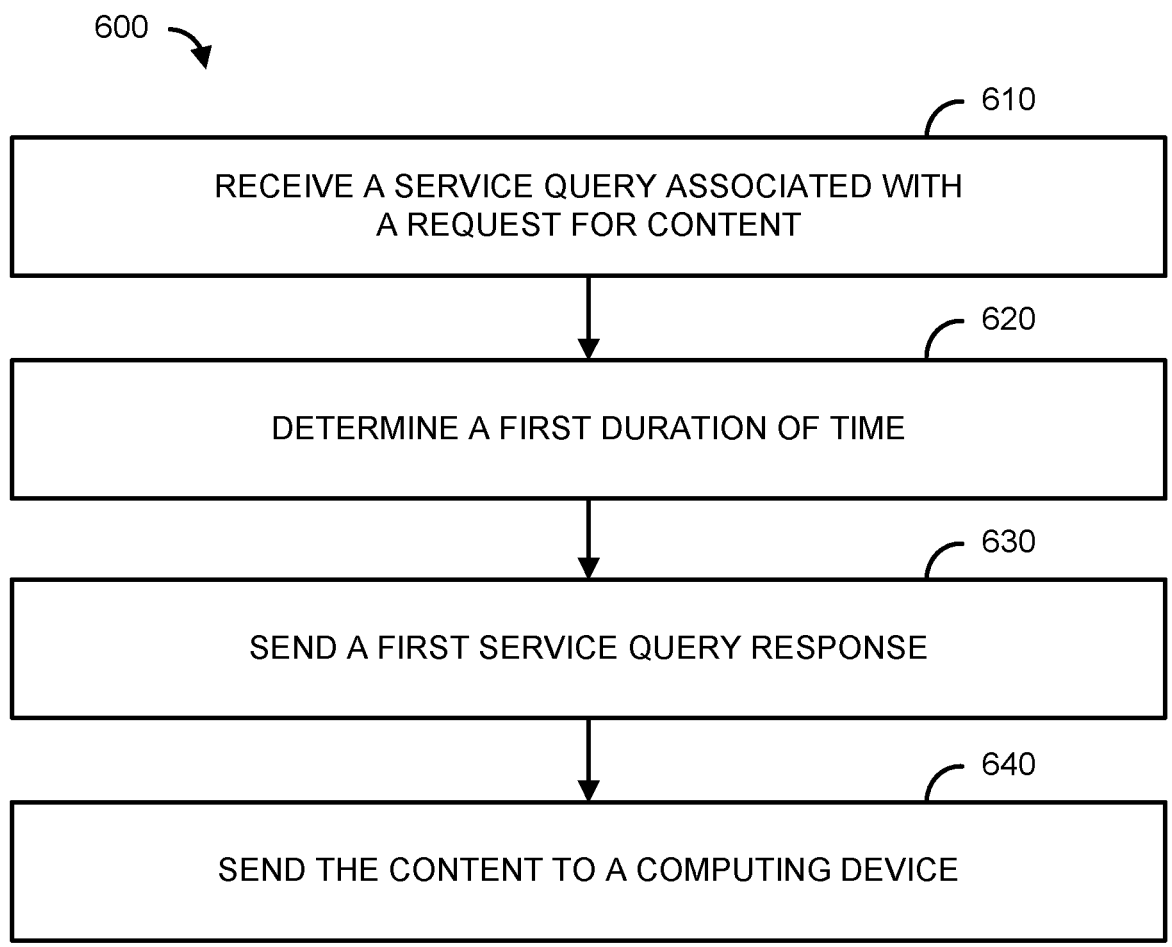
FIG. 6 shows a flowchart of an example method for content delivery.

FIG. 6 is a flowchart of a method 600 for content delivery in accordance with the present description. Th method 600 may be implemented using the system 100 of FIG. 1 and/or the system 200 of FIG. 2. For example, the method 600 may be performed by a first caching device, such as the edge cache 128 or 130, the caching device 206 or 208, etc. At step 610, the first caching device may receive a service query associated with a request for content from a first computing device. For example, the first computing device (e.g., the request server 204) may receive a request for content from a requesting device (e.g., the requesting device 201) and send the request to the first caching device as a service query.

The service query may include the request for the content (e.g., identify the requested content by a URL). The first caching device may be one of a plurality of caching devices in communication with the first computing device, which may be a request server, such as the request server 204. The first computing device may send the service query to each of the plurality of caching devices. A caching device among the plurality of caching devices that has the most available resources to provide the requested content (e.g., to a requesting device) may respond to the service query first. The request for content may have been received by the first computing device from a second computing device.

At step 620, the first caching device may determine a first duration of time (e.g., a response delay). The first duration of time may be based on the service query and one or more parameters. For example, a service parameter may include a determination by the first caching device that the requested content is not resident in memory of the first caching device and an estimated time required to request and receive the content from a content source. As another example, a service parameter may include a computational load of the first caching device, a number of requests for content received by the first caching device within a threshold amount of time, and/or a network load of the first caching device. As a further example, a service parameter may include a fail over status of the first caching device. When the first caching device is operating in place of a failed over other caching device, the first caching device may be close to, or beyond, its intended operating capacity. The first caching device may use the one or more parameters to determine its current health, as described herein. The first duration of time for the first caching device may be based on the determined current health and/or a function of the determined current health, a defined constant, and/or an amount of time that is randomly determined by the first caching device, as described herein. The first duration of time may also include an additional amount of time based on one or more back-off algorithms known in the art.

At step 630, the first caching device may send a first service query response. The first caching device may send the first service query response to the first computing device. The first caching device may send the first service query response after the first duration of time elapses (e.g., the first caching device waits for the first duration of time prior to sending the service query response). The first service query response may indicate the first caching device has sufficient resources to provide the content to the second computing device.

The first caching device may determine whether the service query has been fulfilled by another caching device. (e.g., completed by another caching device). For example, the first caching device may determine whether it has received a service query response from another caching device indicating the other caching device has sent the content to the second computing device. The first caching device may make this determination after the first duration of time elapses (e.g., the first caching device waits for the first duration of time prior to making the determination). At step 640, the first caching device may send the content to the second computing device. The second computing device may be a requesting device, such as the requesting device 201. The content may be sent to the second computing device in response to determining that the first caching device has not received a service query response from another caching device.

Method 600 may include additional steps and features. For example, the first caching device may receive the service query from at least one additional caching device, such as another caching device of the plurality of caching devices. The at least one additional caching device may have received the service query from the first caching device. The at least one additional caching device may determine a second duration of time based on the service query and the one or more parameters (e.g., parameters corresponding to the at least one additional caching device). The second duration of time may correspond to a response delay by the at least one additional caching device with respect to the service query.

The at least one additional caching device may receive the first service query response from the first caching device. The first service query response may be received by the at least one additional caching device may after the first duration of time elapses but prior to the second duration of time elapsing. The first service query response may cause the at least one additional caching device to refrain from sending a second service query response to the first computing device.

As another example, the first computing device may receive the first service query response from the first caching device at a first time, and a second service query response may be received by the first computing device may from the at least one additional caching device at a second time. The first time may occur prior to the second time. The first computing device determine a collision between the first service query and the second service query. Based on the collision and the first service query response, the first computing device may determine that the first caching device satisfies one or more network parameters. The first computing device may instruct the second computing device to send the request for content to the first caching device. For example, the first computing device may instruct the second computing device to send the request for content to the first caching device based on the first caching device satisfying the one or more network parameters. The one or more network parameters may include one or more of: a latency associated with a network connection between the second computing device and the first caching device, a latency associated with a network connection between the second computing device and the second caching device, a geographic distance between the second computing device and the first caching device, a geographic distance between the second computing device and the second caching device, a bitrate associated with the content, a combination thereof, and/or the like.

Figure 7:
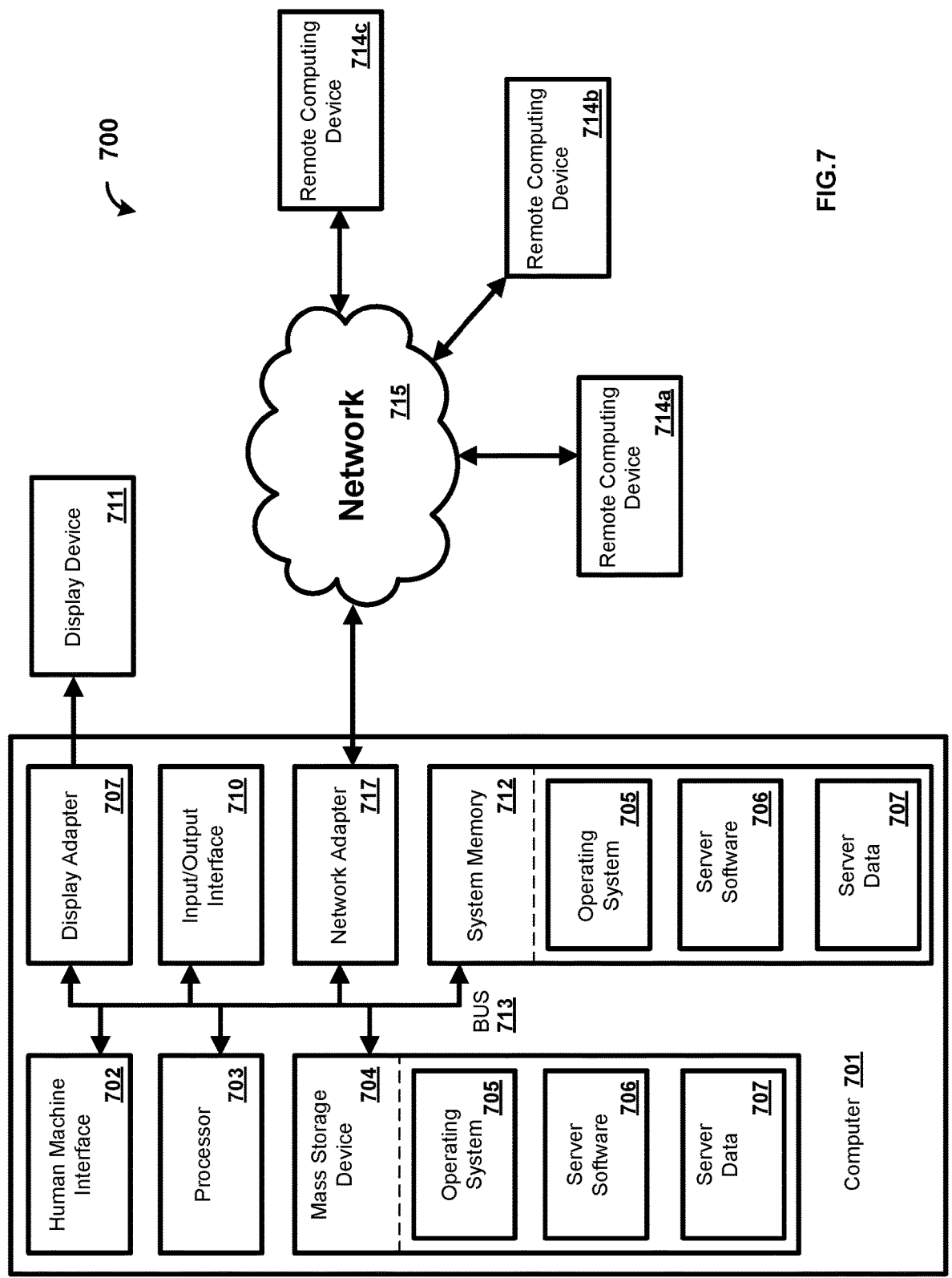
FIG. 7 shows a block diagram of an example computing device.

FIG. 7 shows a system 700 for content delivery in accordance with the present description. The central location 101, the server 110, the mobile device 124, the application server 126, the content source 127, and/or the edge device 127 of FIG. 1 may each be a computer 701 as shown in FIG. 7. Each of the devices/entities shown in FIGS. 2 and 3 may be a computer 701 as shown in FIG. 7. The computer 701 may comprise one or more processors 703, a system memory 712, and a bus 713 that couples various system components including the one or more processors 703 to the system memory 712. In the case of multiple processors 703, the computer 701 may utilize parallel computing. The bus 713 is one or more of several possible types of bus structures, including a memory bus or memory controller, a peripheral bus, an accelerated graphics port, or local bus using any of a variety of bus architectures.

The computer 701 may operate on and/or comprise a variety of computer readable media (e.g., non-transitory media). The readable media may be any available media that is accessible by the computer 701 and may include both volatile and non-volatile media, removable and non-removable media. The system memory 712 has computer readable media in the form of volatile memory, such as random access memory (RAM), and/or non-volatile memory, such as read only memory (ROM). The system memory 712 may store data such as the server data 707 and/or program modules such as the operating system 705 and the server software 706 that are accessible to and/or are operated on by the one or more processors 703.

The computer 701 may also have other removable/non-removable, volatile/non-volatile computer storage media. FIG. 7 shows the mass storage device 704 which may provide non-volatile storage of computer code, computer readable instructions, data structures, program modules, and other data for the computer 701. The mass storage device 704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 704, such as the operating system 705 and the server software 706. Each of the operating system 705 and the server software 706 (e.g., or some combination thereof) may have elements of the program modules and the server software 706. The server data 707 may also be stored on the mass storage device 704. The server data 707 may be stored in any of one or more databases known in the art. Such databases may be DB2®, Microsoft® Access, Microsoft® SQL Server, Oracle®, mySQL, PostgreSQL, and the like. The databases may be centralized or distributed across locations within the network 715.

A user may enter commands and information into the computer 701 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 703 via a human machine interface 702 that is coupled to the bus 713, but may be connected by other interface and bus structures, such as a parallel port, game port, an IEEE 1394 Port (also known as a Firewire port), a serial port, network adapter 7×7, and/or a universal serial bus (USB).

The display device 711 may also be connected to the bus 713 via an interface, such as the display adapter 707. It is contemplated that the computer 701 may have more than one display adapter 707 and the computer 701 may have more than one display device 711. The display device 711 may be a monitor, an LCD (Liquid Crystal Display), light emitting diode (LED) display, television, smart lens, smart glass, and/or a projector. In addition to the display device 711, other output peripheral devices may be components such as speakers (not shown) and a printer (not shown) which may be connected to the computer 701 via the Input/Output Interface 710. Any step and/or result of the methods may be output (or caused to be output) in any form to an output device. Such output may be any form of visual representation, including, but not limited to, textual, graphical, animation, audio, tactile, and the like. The display device 711 and computer 701 may be part of one device, or separate devices.

The computer 701 may operate in a networked environment using logical connections to one or more remote computing devices 714a,b,c. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 701 and a remote computing device 714a,b,c may be made via a network 715, such as a local area network (LAN) and/or a general wide area network (WAN). Such network connections may be through the network adapter 7×7. The network adapter 7×7 may be implemented in both wired and wireless environments. Such networking environments are conventional and commonplace in dwellings, offices, enterprise-wide computer networks, intranets, and the Internet.

Application programs and other executable program components such as the operating system 705 are shown herein as discrete blocks, although it is recognized that such programs and components reside at various times in different storage components of the computing device 701, and are executed by the one or more processors 703 of the computer. An implementation of the server software 706 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
    receiving, by a first caching device from a first computing device, a service query associated with a request for content;
    determining, based on the service query and one or more parameters, a first duration of time; and
    sending, after the first duration of time elapses, the content to a second computing device.

2. The method of claim 1, wherein the request for content is received by the first computing device from the second computing device.

3. The method of claim 1, further comprising sending, to the first computing device, a first service query response that indicates the first caching device has sufficient resources to provide the content to the second computing device.

4. The method of claim 1, wherein the one or more parameters comprises a determination that the content is not resident in memory of the first caching device, a computational load of the first caching device, a number of requests for content received by the first caching device within a threshold amount of time, a network load of the first caching device, or a fail over status of the first caching device.

5. The method of claim 1, further comprising:
receiving, by at least one additional caching device, the service query;
determining, by the at least one additional caching device, a second duration of time;
determining, by the at least one additional caching device, a second service query response; and
receiving, by the at least one additional caching device after the first duration of time elapses and prior to the second duration of time elapsing, a first service query response indicating the first caching device has sufficient resources to provide the content to the second computing device, wherein the first service query response causes the at least one additional caching device to refrain from sending the second service query response to the first computing device.

6. The method of claim 1, further comprising:
sending, by the first computing device to the first caching device and at least one additional caching device, the service query;
receiving, by the first computing device from the first caching device, a first service query response at a first time, wherein the first service query response indicates the first caching device has sufficient resources to provide the content to the second computing device;
determining, by the first computing device, a collision between the first service query response and a second service query response;
determining, by the first computing device based on the collision and the first service query response, that the first caching device satisfies one or more network parameters; and
instructing, by the first computing device based on the first caching device satisfying the one or more network parameters, the second computing device to send the request for content to the first caching device.

7. The method of claim 6, further comprising:
receiving, by the first computing device from the at least one additional caching device, the second service query response at a second time, wherein the first time occurs prior to the second time; and
discarding, by the first computing device based on the second service query response being received after the first service query response, the second service query response.

8. A method comprising:
sending, by a first computing device to a first caching device and a second caching device, a service query associated with a request for content received from a second computing device;
receiving, from the first caching device, a first service query response at a first time;
receiving, from the second caching device, a second service query response at a second time;
determining, based on the first time and the second time, a collision between the first service query response and the second service query response;

determining, based on the collision and the first service query response, that the first caching device satisfies one or more network parameters; and
instructing, based on the first caching device satisfying the one or more network parameters, the second computing device to send the request for content to the first caching device.

9. The method of claim 8, further comprising:
determining, by the first caching device, based on the service query and one or more parameters, a first response delay comprising a first duration of time;
determining, by the second caching device, based on the service query and one or more parameters, a second response delay comprising a second duration of time that is substantially equal to the first duration of time;
sending, by the first caching device after the first duration of time elapses, the first service query response to the first computing device; and
sending, by the second caching device after the second duration of time elapses, the second service query response to the first computing device.

10. The method of claim 9, wherein the one or more parameters for each of the first caching device and the second caching device comprises a determination that the content is not resident in memory, a computational load, a number of requests for content received within a threshold amount of time, a network load, or a fail over status.

11. The method of claim 8, wherein the first service query response indicates the first caching device has sufficient resources to provide the content to the second computing device, and wherein the second service query response indicates the second caching device has sufficient resources to provide the content to the second computing device.

12. The method of claim 8, wherein the one or more network parameters comprises a latency associated with a network connection between the second computing device and the first caching device, a latency associated with a network connection between the second computing device and the second caching device, a geographic distance between the second computing device and the first caching device, a geographic distance between the second computing device and the second caching device, or a bitrate associated with the content.

13. The method of claim 8, wherein the first time and the second time are within a threshold range of time.

14. The method of claim 8, wherein the first time occurs prior to the second time, and the method further comprises:
discarding, based on the second service query response being received after the first service query response, the second service query response.

15. A method comprising:
receiving, by a first caching device from a first computing device, a service query associated with a request for content;
determining, based on the service query and one or more parameters, a first duration of time;
sending, to the first computing device after the first duration of time elapses, a first service query response that indicates the first caching device has sufficient resources to provide the content to a second computing device; and
sending the content to the second computing device.

16. The method of claim 15, wherein the request for content is received by the first computing device from the second computing device.

17. The method of claim 15, further comprising: determining whether a service query response has been received from another caching device.

18. The method of claim 17, wherein the content is sent to the second computing device based on the determination that no service query response has been received from another caching device.

19. The method of claim 15, wherein the one or more parameters comprises a determination that the content is not resident in memory of the first caching device, a computational load of the first caching device, a number of requests for content received by the first caching device within a threshold amount of time, a network load of the first caching device, or a fail over status of the first caching device.

20. The method of claim 15, further comprising:
- receiving, by at least one additional caching device, the service query;
- determining, by the at least one additional caching device, a second duration of time;
- determining, by the at least one additional caching device, a second service query response; and
- receiving, by the at least one additional caching device after the first duration of time elapses and prior to the second duration of time elapsing, the first service query response, wherein the first service query response causes the at least one additional caching device to refrain from sending the second service query response to the first computing device.

* * * * *